United States Patent [19]

Faraboschi et al.

[11] Patent Number: 5,870,576
[45] Date of Patent: Feb. 9, 1999

[54] METHOD AND APPARATUS FOR STORING AND EXPANDING VARIABLE-LENGTH PROGRAM INSTRUCTIONS UPON DETECTION OF A MISS CONDITION WITHIN AN INSTRUCTION CACHE CONTAINING POINTERS TO COMPRESSED INSTRUCTIONS FOR WIDE INSTRUCTION WORD PROCESSOR ARCHITECTURES

[75] Inventors: Paolo Faraboschi, Cambridge; Joseph A. Fisher, Brookline, both of Mass.

[73] Assignee: Hewlett-Packard Company, Palo Alto, Calif.

[21] Appl. No.: 767,450

[22] Filed: Dec. 16, 1996

[51] Int. Cl.[6] .............................. G06F 12/04; G06F 13/00; G06F 9/30
[52] U.S. Cl. .......................... 395/386; 395/384; 395/386; 395/391; 395/392; 395/383; 395/800.24; 701/125; 701/207; 701/118
[58] Field of Search ...................................... 395/384, 386, 395/391, 392, 383, 800.24; 701/125, 207

[56] References Cited

U.S. PATENT DOCUMENTS

| | | | |
|---|---|---|---|
| 4,920,477 | 4/1990 | Colwell et al. | 711/207 |
| 5,057,837 | 10/1991 | Colwell et al. | 395/392 |
| 5,109,495 | 4/1992 | Fite et al. | 395/383 |
| 5,179,680 | 1/1993 | Colwell et al. | 395/392 |
| 5,353,426 | 10/1994 | Patel et al. | 711/118 |
| 5,446,850 | 8/1995 | Jeremiah et al. | 395/391 |
| 5,488,710 | 1/1996 | Sato et al. | 395/386 |
| 5,553,254 | 9/1996 | Berstis et al. | 395/383 |
| 5,721,854 | 2/1998 | Ebcioglu | 395/391 |
| 5,737,749 | 4/1998 | Patel et al. | 711/125 |

*Primary Examiner*—Richard L. Ellis
*Assistant Examiner*—William D. Thomson

[57] ABSTRACT

Methods apparatus for storing and expanding wide instruction words in a computer system are provided. The computer system includes a memory and an instruction cache. Compressed instruction words of a program are stored in a code heap segment of the memory, and code pointers are stored in a code pointer segment of the memory. Each of the code pointers contains a pointer to one of the compressed instruction words. Part of the program is stored in the instruction cache as expanded instruction words. During execution of the program, an instruction word is accessed in the instruction cache. When the instruction word required for execution is not present in the instruction cache, thereby indicating a cache miss, a code pointer corresponding to the required instruction word is accessed in the code pointer segment of memory. The code pointer is used to access a compressed instruction word corresponding to the required instruction word in the code heap segment of memory. The compressed instruction word is expanded to provide an expanded instruction word, which is loaded into the instruction cache and is accessed for execution.

14 Claims, 5 Drawing Sheets

METHOD AND APPARATUS FOR STORING AND EXPANDING VARIABLE-LENGTH PROGRAM INSTRUCTIONS UPON DETECTION OF A MISS CONDITION WITHIN AN INSTRUCTION CACHE CONTAINING POINTERS TO COMPRESSED INSTRUCTIONS FOR WIDE INSTRUCTION WORD PROCESSOR ARCHITECTURES

FIELD OF THE INVENTION

This invention relates to computers which utilize wide instruction words to achieve instruction level parallelism and, more particularly, to methods and apparatus for storing wide instruction words in compressed form and for expanding the compressed instruction words for execution.

BACKGROUND OF THE INVENTION

One of the approaches to improving microprocessor performance is instruction level parallel processing. Instruction level parallel processing involves execution in parallel of low level machine operations, such as memory loads and stores, integer additions and floating point multiplications. Processors for implementing instruction level parallelism typically include multiple execution units and are controlled by very long instruction words (VLIW's). Each VLIW specifies the operations that are to be executed in a single cycle and includes multiple operation fields. The source program is typically written in a high level language without attention to operations that can be performed in parallel. The conversion of a source program to machine code which utilizes instruction level parallelism involves scheduling of operations which can be executed in parallel. The scheduling function may be performed by a compiler or by the processor itself. When scheduling is performed by the processor, the processor hardware may become complex. When scheduling is performed by the compiler, the processor simply executes the operations contained in the VLIW. Instruction level parallel processing is described by J. A. Fisher et al in *Science*, Vol. 253, Sep. 13, 1991, pp. 1233–1241 and by B. Ramakrishna et al in the *Journal of Supercomputing*, Vol. 7, 1993, pp. 9–50.

For maximum utilization of a processor having multiple execution units, each execution unit should perform an operation on every processor cycle. The execution units of the processor may be fully utilized during computation-intensive portions of a program. In this case, all or nearly all of the operation fields of the VLIW are filled. Other portions of the program may not require all of the resources of the processor. In this case, some of the execution units are idle, and one or more operation fields of the VLIW are not filled. The number of unfilled operation fields in a program may be significant. Storing instruction words with significant numbers of unfilled operation fields in memory is wasteful of valuable memory space. To avoid inefficient use of memory techniques, for storing wide instruction words in compressed format have been proposed.

In one prior art approach, compressed instruction words are stored with a mask word. The operation fields of the instruction word are stored in consecutive memory locations, or words. The mask word encodes where the memory words are inserted in the expanded instruction word. Since the mask word is normally only a few bits wide, two or more mask words can be grouped in the same memory word. This approach is illustrated in FIG. 1. An instruction word pair is stored in compressed format in memory as a mask word 20 followed in consecutive memory locations by operations W00, W02, W05, W06, and W07 of a first instruction word and operations W12 and W14 of a second instruction word. A mask field 22 in mask word 20 indicates the locations of the operations W00, W02, W05, W06 and W07 in a first line 34 of instruction cache 24, and mask field 26 indicates the positions of operations W12 and W14 in a second line 36 of instruction cache 24.

Due to the variable length of the compressed instruction format in memory, it is necessary to record the offset to the next instruction address somewhere in the instruction itself. The offset must also be stored in the instruction cache to be able to execute correct program counter sequencing and to maintain coherency between the program counter and the main memory code image. The offset to the next instruction address can be stored in mask word 20 as fields 30 and 32 and can be stored in instruction cache 24 as fields 38 and 40. An instruction compression and expansion technique similar to that shown in FIG. 1 and described above is disclosed in U.S. Pat. No. 5,057,837 issued Oct. 15, 1991 to Colwell et al. and U.S. Pat. No. 5,179,680 issued Jan. 12, 1993 to Colwell et al.

The major disadvantage of using the technique shown in FIG. 1 and described above is that consecutive instructions do not correspond to consecutive instruction cache locations, as they are separated by an address difference that depends on the variable length of the instruction. This introduces an artificial alias for instructions that are physically separated by a distance that is larger than the instruction cache size. For example, in a 1024 line instruction cache, a code section of 1024 instructions will very likely contain aliases to the same cache locations, unless proper padding is performed by the loader. This padding is possible only if empty spaces are left in main memory. In the example of FIG. 1, instruction pair #n occupies a cache hole left by the previous instructions. To achieve this, the assembler is forced to leave empty memory areas to get to the desired address of the cache hole. In the example of FIG. 1, twelve memory words are wasted to avoid a conflicting address for instruction pair #m.

In summary, the technique shown in FIG. 1 and described above has several disadvantages. The instruction cache must have a larger capacity to store the offset to the next instruction address. Program counter sequencing is complicated, because it needs to compute the next instruction addresses. The variable instruction length introduces artificial aliases in the instruction cache. If the loader pads instructions in main memory to avoid the problem of artificial aliases, holes are created in main memory.

In another prior art approach described by J. P. Hayes in *Computer Architecture and Organization*, McGraw-Hill, 1978, pp. 309–314, a processor uses two levels of microprogram control. Each instruction fetched from main memory is interpreted by a microprogram stored in a control memory. Each microinstruction is interpreted by a nanoprogram stored in a second control memory. The nanoinstructions directly control the hardware.

SUMMARY OF THE INVENTION

According to a first aspect of the invention, a method for storing and expanding wide instruction words in a computer system is provided. The computer system includes a memory and an instruction cache. Compressed instruction words of a program are stored in a code heap segment of the memory. Code pointers are stored in a code pointer segment of the memory. Each of the code pointers contains a pointer to one of the compressed instruction words. A part of the program is stored in the instruction cache as expanded instruction words. During execution of the program, an instruction word is accessed in the instruction cache. When the instruction word required for execution is not present in the instruction cache, thereby indicating a cache miss, a code pointer corresponding to the required instruction word is accessed in the code pointer segment of the memory. The code pointer is used to access a compressed instruction word corresponding to the required instruction word in the code heap segment of the memory. The compressed instruction word is expanded to provide an expanded instruction word, which is loaded into the instruction cache and is accessed for execution.

Each compressed instruction word may comprise one or more operations. Each of the code pointers may include a mask word that defines the positions of the operations in the expanded instruction word. The code pointers may be stored at equally spaced locations in the memory, and successive instruction words of the program may be stored in equally spaced locations of the instruction cache.

The compressed instruction word is expanded by loading the operations of the compressed instruction word into the expanded instruction word in the positions defined by the mask word. The compressed instruction word may be accessed by computing an address of the compressed instruction word from the code pointer and reading the compressed instruction word at the computed address in the code heap segment of memory.

According to another aspect of the invention, apparatus for storing and expanding wide instruction words in a computer system is provided. The apparatus comprises a memory, including a code heap segment for storing compressed instruction words of a program and a code pointer segment for storing code pointers. Each of the code pointers contain a pointer to one of the compressed instruction words. The apparatus further comprises an instruction cache for storing a part of the program as expanded instruction words, a program counter for accessing an instruction word of the program in the instruction cache for execution, means responsive to a cache miss for accessing a code pointer corresponding to the required instruction word in the code pointer segment of the memory, means responsive to the code pointer for accessing a compressed instruction word corresponding to the required instruction word in the code heap segment of the memory, means for expanding the compressed instruction word to provide an expanded instruction word and means for loading the expanded instruction word into the instruction cache, wherein the expanded instruction word is accessed by the program counter for execution.

BRIEF DESCRIPTION OF THE DRAWINGS

For a better understanding of the present invention, reference is made to the accompanying drawings, which are incorporation herein by reference and in which.

DETAILED DESCRIPTION

Figure 1:
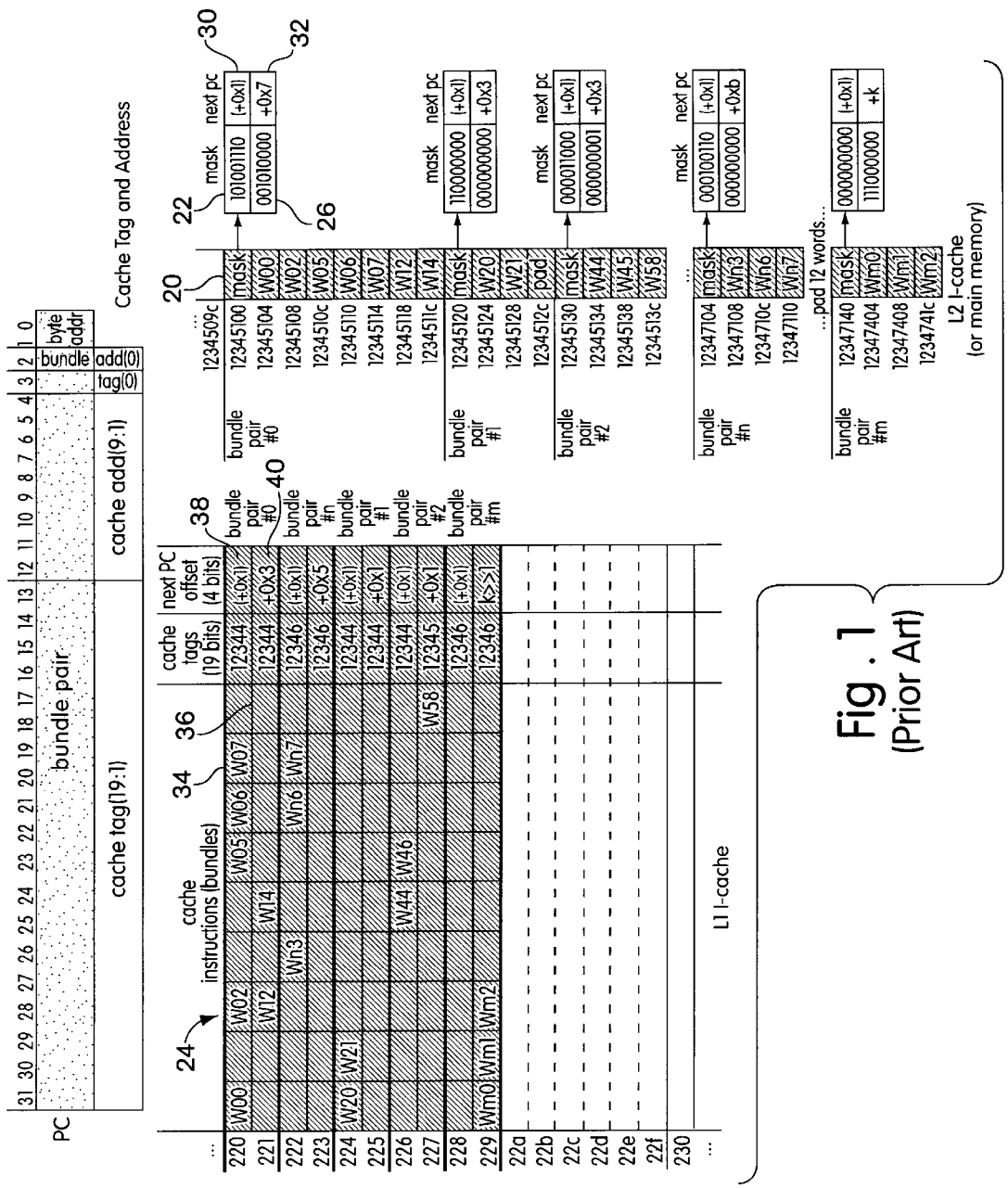
FIG. 1 is a schematic representation of an instruction cache and a memory, illustrating storage of wide instruction words in compressed format in accordance with the prior art.
Figure 2:
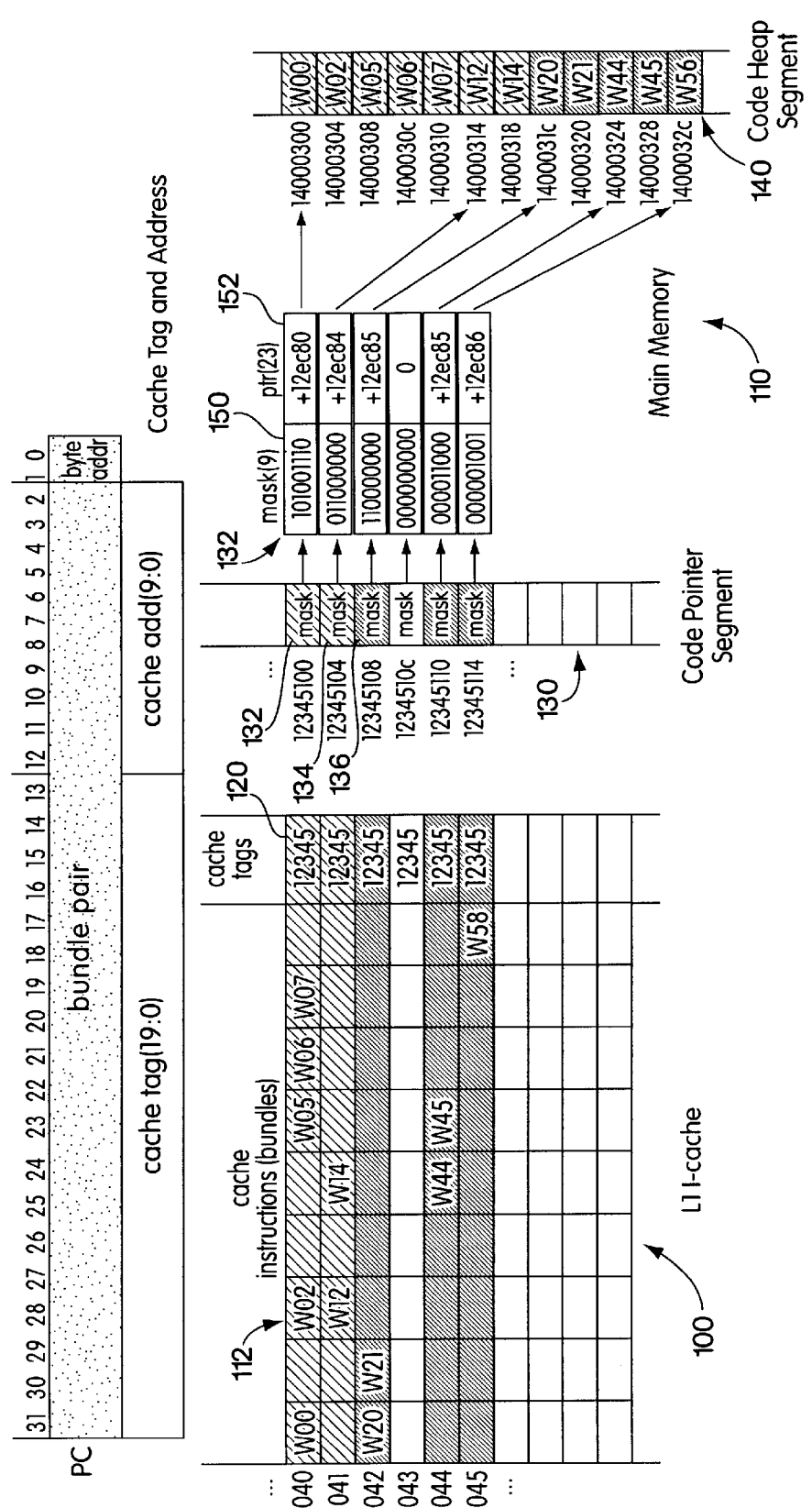
FIG. 2 is a schematic representation of an instruction cache and a memory, illustrating storage of wide instruction words in compressed format in accordance with present invention.

An instruction cache 100 and a memory 110 of a computer system are shown schematically in FIG. 2. Instruction words of a program segment are stored at successive lines 040, 041, 042, etc. of instruction cache 100. Each cache line contains a wide instruction word that specifies one or more operations to be executed during each processor cycle. As used herein, "instruction word" refers to a wide instruction word that specifies one or more functions to be performed in the same processor cycle, and "operation" refers to the operation fields of a wide instruction word. Each operation field of the wide instruction word may include an op code and one or more operands. In the example of FIG. 2, each instruction word has nine operation fields. The number of operation fields in the instruction word and the number of bits per operation field may be different for different processor architectures. An instruction word 112 stored at cache line 040 includes operations W00, W02, W05, W06 and W07. Four operation fields of instruction word 112 are empty. Instruction cache 100 further includes cache tags 120 in which the upper order bits of the instruction address are stored.

The number of operations in the instruction words is variable between zero and the maximum number of operation fields in the instruction word. It will be understood that an instruction word may contain no operations, as for example cache line 043 in instruction cache 100. For optimum utilization of the processor, the number of operations executed in parallel should be maximized. In computation-intensive portions of the program, a large degree of parallelism may be possible, whereas in other portions of the program fewer operations can be performed in parallel. In those portions where a low degree of parallelism is achieved, the instruction words are sparsely populated with operations, thus resulting in numerous empty operation fields. In the program segment illustrated in the example of FIG. 2, twelve operations are contained in seven instruction words. If the program segment is stored in memory in uncompressed format, sixty-three memory locations are required, fifty-one of which are unfilled, resulting in highly inefficient memory utilization. Therefore program compression techniques are preferably utilized for storage of the program in memory 110.

In accordance with the invention, the portion of memory 110 where program instructions are stored is organized as a code pointer segment 130 and a code heap segment 140. The code pointer segment 130 includes a series of code pointer words, each of which includes a code pointer and a mask as described below. The code pointer words 132, 134, 136, etc. are located at the same instruction addresses as corresponding instruction words in instruction cache 100. Thus, there is a one-to-one correspondence between instruction cache lines and code pointer addresses in memory 110.

The code heap segment 140 contains the operations of each instruction word in consecutive memory locations. Thus, for example, the operations W00, W02, W05, W06 and W07 of instruction word 112 are stored at consecutive memory locations in code heap segment 140. The remaining operations of each instruction word of the program segment are stored at consecutive memory locations in code heap segment 140. Thus, the code heap segment 140 provides compressed storage of the operations of each instruction word.

Each code pointer word 132, 134, 136, etc. includes a mask 150 and a code pointer 152. Code pointer 152 contains an offset to the first operation of the compressed instruction word in code heap segment 140. The mask 150 contains one bit for each operation field in the instruction word. Bits of the mask 150 are set to indicate that the corresponding operation field of the instruction word is filled. Thus in the example of FIG. 2, mask 150 of code pointer word 132 indicates that operation fields 0, 2, 5, 6 and 7 of instruction word 112 are filled. When the instruction word is a no op, the mask and the code pointer 152 may include null fields to indicate that no operations are contained in the code heap segment 140. Accessing of the code pointer segment 130 and the code heap segment 140 during cache refill is described below.

Figure 3:
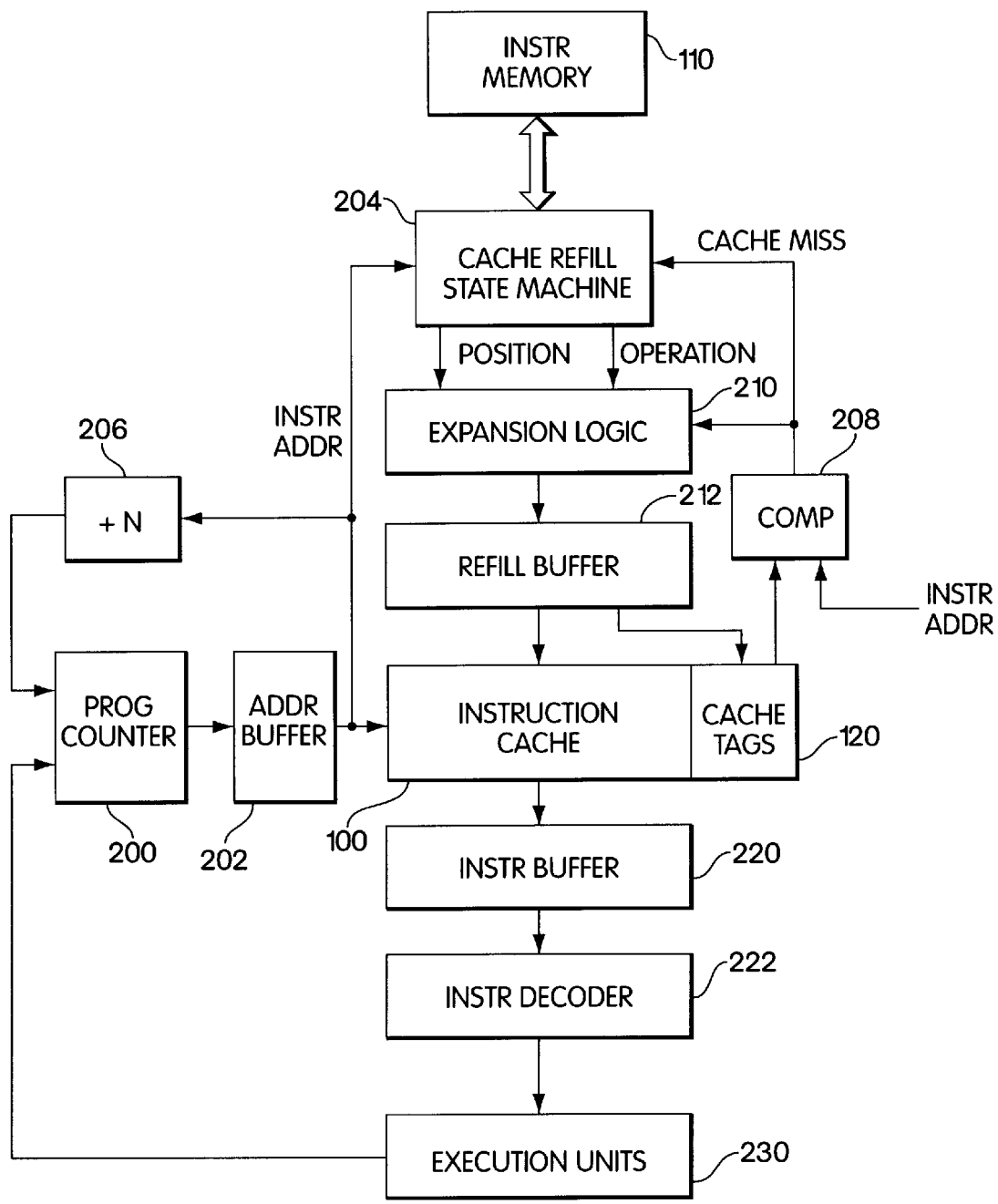
FIG. 3 is a schematic block diagram of a computer system for storing and expanding wide instruction words in accordance with the present invention.

A block diagram of a computer system, illustrating portions required for storing and expanding wide instruction words and for executing wide instruction words, is shown in FIG. 3. A program counter 200 provides successive instruction addresses of a program being executed to instruction cache 100 through an address buffer 202. Instruction addresses are also provided to a cache refill state machine 204, an adder 206 which increments program counter 200, and to a comparator 208. The cache refill state machine 204 controls refilling of instruction cache 100 from instruction memory 110 when a cache miss occurs. A cache miss occurs when the required instruction word, i.e. the instruction word specified by the instruction address, is not present in instruction cache 100. Expansion logic 210 controls expansion of compressed instruction words stored in instruction memory 110 to expanded instruction words for storage in instruction cache 100. A refill buffer 212 is used for temporary storage of an instruction word as it is converted from compressed format to expanded format. When the expanded instruction word is complete, it is transferred into instruction cache 100. Instruction words are transferred from instruction cache 100 to an instruction buffer 220 and then to an instruction decoder 222. The instruction decoder 222 decodes each operation in the instruction word and provides control signals to execution units 230. In a processor which utilizes wide instruction words, execution units 230 may include two or more arithmetic units and/or multipliers for parallel computation. Furthermore, the execution units 230 may access a data cache and/or memory in parallel with the computations. In the case of a branch instruction, the execution units 230 may supply the program counter 200 with a branch address, thereby overriding normal program sequencing. The comparator 208 compares the instruction address with the cache tags 120 to determine if the required instruction word is present in instruction cache 100.

Figure 4A:
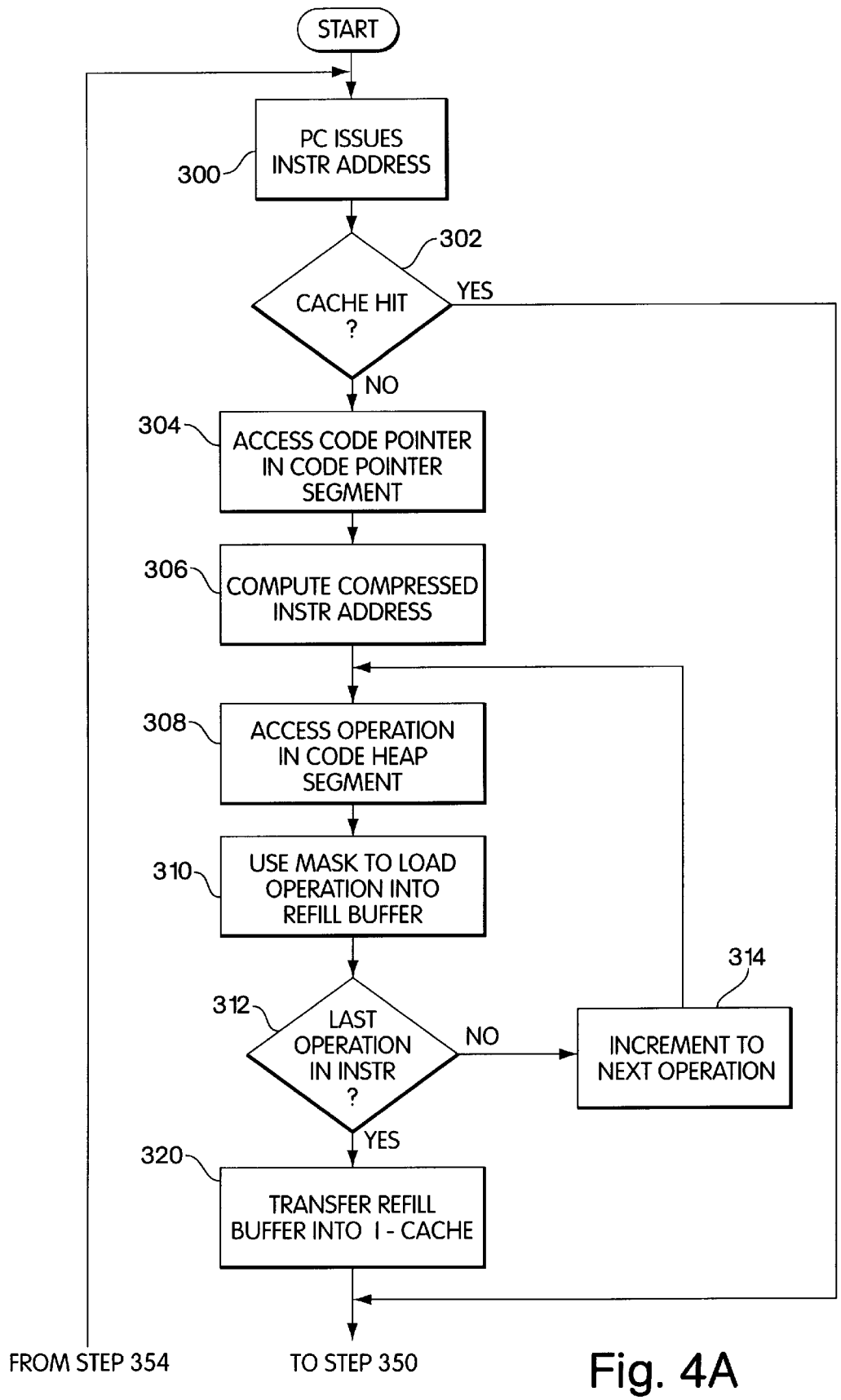
FIGS. 4A and 4B show a flow diagram of a process for cache refill in accordance with the present invention.
Figure 4B:
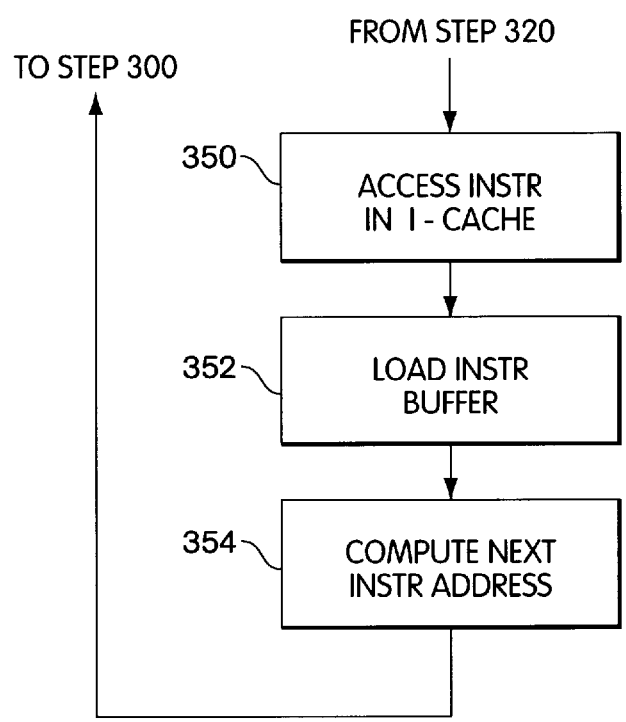

A flow diagram of an example of a process for cache refill in accordance with the present invention is shown in FIGS. 4A and 4B. The process is performed during execution of a program comprising wide instruction words as described above. The program counter 200 issues an instruction address in step 300. The instruction address is forwarded to instruction cache 100. The instruction address is compared with the cache tags 120 in step 302 to determine whether the required instruction is present in instruction cache 100. A cache hit occurs when the required instruction is stored in the instruction cache 100, whereas a cache miss occurs when the required instruction is not present in the instruction cache. When a cache hit is determined in step 302, the instruction is accessed in instruction cache 100 in step 350 (FIG. 4B). The accessed instruction is loaded into instruction buffer 220 in step 352, and the instruction is decoded by instruction decoder 222 for execution by execution units 230. In step 354, the next instruction address is computed. During normal program sequencing, the instruction address is incremented by a predetermined number by adder 206 to access the next instruction in instruction cache 100. In the example of FIG. 2, the program counter 200 is incremented to the next line of instruction cache 100. In the case of a branch instruction, the execution units 230 provide an address of the branch instruction to program counter 200. The process then returns to step 300 and the program counter 200 issues the next instruction address.

When a cache hit does not occur (i.e., a cache miss) in step 302, the cache refill state machine 204, in step 304, accesses the code pointer word corresponding to the required instruction address in the code pointer segment 130 of memory 110. As indicated above, the code pointer word is stored in memory 110 at the instruction address. The mask 150 and the code pointer 152 are returned to the cache refill state machine. The offset contained in the code pointer is used in step 306 to compute the address of the compressed instruction word in the code heap segment 140 of memory 110. As discussed above, the code heap segment 140 contains the operations of the wide instruction word at consecutive memory locations. Code pointer 152 points to the first operation of the wide instruction word. In step 308, the cache refill state machine 204 uses the address computed in step 306 to access the first operation of the instruction word in the code heap segment 140. In step 310, the cache refill state machine 204 uses the mask 150 to load the operation accessed in step 308 into refill buffer 212. In particular, cache refill state machine 204 provides the operation and the position of the operation in the wide instruction word (from mask 150) to expansion logic 210. Expansion logic 210 uses this information to load the operation into the appropriate operation field in refill buffer 212. In step 312, the cache refill state machine 204 determines whether the last operation in the instruction word has been read from the code heap segment 140. This determination is made from the mask. In particular, the mask 150 indicates the number of operations in the wide instruction word. When the last operation has not been read, the cache refill state machine 204 increments to the next operation in step 314. Since operations of the instruction word are stored in consecutive memory locations in code heap segment 140, the cache refill state machine 204 simply increments to the next memory location. The process then returns to step 308 to access the next operation in code heap segment 140. The loop, including steps 308, 310, 312 and 314, is repeated until all operations of the instruction word have been accessed and loaded into refill buffer 212. When the last operation of the instruction word has been loaded into the refill buffer as determined in step 312, the contents of the refill buffer are transferred into the instruction cache 100 in step 320. Then, the instruction is accessed in the instruction cache 100 in step 350 as described above.

The process of FIGS. 4A and 4B may be illustrated by an example with reference to FIG. 2. If the program counter 200 issues an instruction address corresponding to instruction word 112 in instruction cache 100, the instruction cache 100 is addressed. When the instruction word 112 is present in instruction cache 100, it is accessed and executed. When the instruction word 112 is not present in instruction cache 100, the cache refill state machine 204 accesses code pointer word 132 in code pointer segment 130 of memory 110. The code pointer 152 is used to compute the address of operation W00 in code heap segment 140. Operation W00 is accessed and is loaded into the first operation field of refill buffer 212. The cache refill state machine 204 then increments to operation W02 in code heap segment 140 and loads operation W02 into the third operation field of the refill buffer, using mask 150 to determine the location of the operation in the instruction word. This process is repeated until operations W05, W06 and W07 have been accessed in code heap segment 140 and loaded into the proper operation fields of the refill buffer 212. The expanded instruction word is then transferred from refill buffer 212 to instruction cache 100, where it can be accessed for execution.

The instruction cache 100 has been described as including one wide instruction word in each cache line. In an alternate embodiment, more than one wide instruction word may be included in each cache line. Furthermore, although the operations of each individual compressed instruction word should be stored at consecutive memory locations, it is not necessary that the compressed instruction words of a program or program segment be stored in contiguous areas of memory. In yet another configuration, the code pointer word contains only a code pointer, and the mask is stored in a first word of the code heap segment 140. This approach has the disadvantage that two words rather than one are required for the code pointer and mask. However, this approach will accommodate larger offsets and larger masks (i.e., wider instruction words).

The present invention is not limited to the compression technique shown and described herein. Any compression technique may be used for storing instruction words in compressed format in code heap segment 140. In each case, the code pointer contains an offset which specifies the starting location of the compressed format instruction word.

The invention has been described in connection with VLIW processor architectures. However, the invention may be utilized in any processor architecture that has instructions containing multiple operations that are put together and used repeatedly.

The technique for storing and expanding wide instruction words in accordance with the invention has a number of advantages over prior art techniques. Artificial aliases in the instruction cache are avoided, and cache properties are equivalent to traditional caches in terms of locality. Instruction padding is not necessary. Furthermore, sequencing of the program counter is conventional. The address computations required during cache refill are trivial, and the instruction cache refill mechanism is simple. The instruction cache is not required to store offsets to the next instruction address.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A method for storing and expanding wide instruction words of a computer program in a computer system including a memory and an instruction cache, comprising the steps of:

storing the wide instruction words in said instruction cache as expanded instruction words having a predetermined number of operation fields, any number of which may contain operations and any number of which may be empty;

storing the wide instruction words in a code heap segment of said memory as compressed instruction words, said compressed instruction words being formed by compressing said expanded instruction words to remove the empty operation fields;

storing code pointers in a code pointer segment of said memory, each of said code pointers containing a pointer to one of said compressed instruction words;

accessing an instruction word of the program in said instruction cache for execution;

when the instruction word required for execution is not present in said instruction cache, thereby indicating a cache miss, accessing a code pointer corresponding to said required instruction word in the code pointer segment of said memory;

accessing a compressed instruction word corresponding to said required instruction word in the code heap segment of said memory, using the code pointer;

expanding said compressed instruction word to provide an expanded instruction word;

loading said expanded instruction word into said instruction cache; and accessing said expanded instruction word in said instruction cache for execution.

2. A method as defined in claim 1, wherein each of said code pointers further comprises a mask word that defines the positions of said operations in said expanded instruction word.

3. A method as defined in claim 2, wherein the step of expanding said compressed instruction word comprises loading the operations of said compressed instruction word into said expanded instruction word in the positions defined by said mask word.

4. A method as defined in claim 1, wherein the step of storing said code pointers includes storing said code pointers at equally spaced locations in said memory, and wherein the step of storing the wide instruction words in said instruction cache includes storing successive instruction words of the program in equally spaced locations of said instruction cache.

5. A method as defined in claim 4, further including the step of accessing a next instruction word of the program in said instruction cache for execution by incrementing an instruction address of the current instruction word by a predetermined increment.

6. A method as defined in claim 1, wherein the step of storing the wide instruction words in said code heap segment as compressed instruction words comprises storing the operations of said compressed instructions words at successive locations in said code heap segment of said memory.

7. A method as defined in claim 1, wherein the step of accessing said compressed instruction word includes computing an address of said compressed instruction word in response to said code pointer and reading said compressed instruction word at said computed address in said code heap segment.

8. A method as defined in claim 7, wherein the step of reading said compressed instruction word comprises reading the operations of said compressed instruction word at successive memory locations.

9. Apparatus for storing and expanding wide instruction words of a computer program in a computer system, comprising:

an instruction cache for storing the wide instruction words as expanded instruction words having a predetermined number of operation fields, any number of which may contain operations and any number of which may be empty;

a memory including a code heap segment for storing the wide instruction words as compressed instruction words, said compressed instruction words being formed by compressing said expanded instruction words to remove the empty operation fields, and a code pointer segment for storing code pointers, each of said code pointers containing a pointer to one of said compressed instruction words;

a program counter for accessing an instruction word of the program in said instruction cache for execution;

means responsive to a cache miss, wherein the instruction word required for execution is not present in said instruction cache, for accessing a code pointer corresponding to said required instruction word in the code pointer segment of said memory;

means responsive to said code pointer for accessing a compressed instruction word corresponding to said required instruction word in the code heap segment of said memory;

means for expanding said compressed instruction word to provide an expanded instruction word; and means for loading said expanded instruction word into said instruction cache, wherein said expanded instruction word is accessed by said program counter for execution.

10. Apparatus as defined in claim 9, wherein each of said code pointers further comprises a mask word that defines the positions of said operations in said expanded instruction word.

11. Apparatus as defined in claim 10, wherein said means for expanding said compressed instruction word comprises means for loading the operations of said compressed instruction word into said expanded instruction word in the positions defined by said mask word.

12. Apparatus as defined in claim 9, wherein said means for accessing said compressed instruction word includes means for computing an address of said compressed instruction word in response to said code pointer and means for reading said compressed instruction word at said computed address in said code heap segment.

13. Apparatus as defined in claim 12, wherein said means for reading said compressed instruction word comprises means for reading the operations of said compressed instruction word at successive memory locations.

14. Apparatus as defined in claim 9 further comprising means for accessing a next instruction word of the program in said instruction cache for execution by incrementing an instruction address of the current instruction word by a predetermined increment.

* * * * *